United States Patent
Sasano et al.

(10) Patent No.: US 8,547,593 B2
(45) Date of Patent: Oct. 1, 2013

(54) DOCUMENT READING DEVICE AND IMAGE FORMING APPARATUS

(75) Inventors: Tsuyoshi Sasano, Saitama (JP); Atsuya Baba, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 765 days.

(21) Appl. No.: 12/542,321

(22) Filed: Aug. 17, 2009

(65) Prior Publication Data

US 2010/0053696 A1 Mar. 4, 2010

(30) Foreign Application Priority Data

Sep. 3, 2008 (JP) ................................ 2008-226025

(51) Int. Cl.
*G06F 15/00* (2006.01)
*G03G 15/00* (2006.01)

(52) U.S. Cl.
USPC ................................ 358/1.9; 399/14; 399/81

(58) Field of Classification Search
USPC ............... 358/1.2, 1.12, 1.18, 1.13, 488, 539, 358/407, 1.9, 534, 441, 504; 399/81, 14, 399/86, 370, 376, 389, 82; 382/286, 287, 382/289
See application file for complete search history.

(56) References Cited

U.S. PATENT DOCUMENTS

| 6,285,842 | B1 * | 9/2001 | Katamoto et al. ............... 399/81 |
| 6,320,673 | B1 * | 11/2001 | Motosugi ......................... 358/1.9 |
| 6,415,110 | B1 * | 7/2002 | Kimura ............................ 399/14 |
| 2001/0009615 | A1 | 7/2001 | Yokobori et al. |
| 2003/0215252 | A1 | 11/2003 | Yokobori et al. |
| 2004/0136734 | A1 | 7/2004 | Yokobori et al. |
| 2008/0180711 | A1 * | 7/2008 | Ebuchi ......................... 358/1.12 |

FOREIGN PATENT DOCUMENTS

| JP | A-9-16044 | 1/1997 |
| JP | A-2001-166641 | 6/2001 |
| JP | A-2005-35101 | 2/2005 |
| JP | A-2007-74150 | 3/2007 |

OTHER PUBLICATIONS

Notification of Reasons for Refusal dated Aug. 9, 2010 in corresponding Japanese Patent Application No. 2008-226025 (with translation).

* cited by examiner

*Primary Examiner* — Charlotte M Baker
(74) *Attorney, Agent, or Firm* — Oliff & Berridge, PLC

(57) ABSTRACT

A document reading device includes: a document image acquisition unit that reads a document and obtains a document image; a memory that holds the document image obtained by the document image acquisition unit; a determination unit that determines whether or not a size or orientation of the document, the image of which is obtained by the document image acquisition unit, matches a set parameter; and a setting change unit that, when it is determined that the size or orientation of the document does not match the set parameter, changes a setting of the parameter so as to match the size or orientation of the document.

5 Claims, 7 Drawing Sheets

DOCUMENT READING DEVICE AND IMAGE FORMING APPARATUS

CROSS-REFERENCE TO RELATED APPLICATIONS

This application is based on and claims priority under 35 USC 119 from Japanese Patent Application No. 2008-226025 filed Sep. 3, 2008.

BACKGROUND

Technical Field

The present invention relates to a document reading device and an image forming apparatus.

SUMMARY

According to an aspect of the invention, there is provided a document reading device including: a document image acquisition unit that reads a document and obtains a document image; a memory that holds the document image obtained by the document image acquisition unit; a determination unit that determines whether or not a size or orientation of the document, the image of which is obtained by the document image acquisition unit, matches a set parameter; and a setting change unit that, when it is determined that the size or orientation of the document does not match the set parameter, changes a setting of the parameter so as to match the size or orientation of the document.

BRIEF DESCRIPTION OF THE DRAWINGS

An exemplary embodiment of the present invention will be described in detail based on the following figures, wherein.

DETAILED DESCRIPTION

Next, an exemplary embodiment of the present invention will be described based on the drawings.

Figure 1:
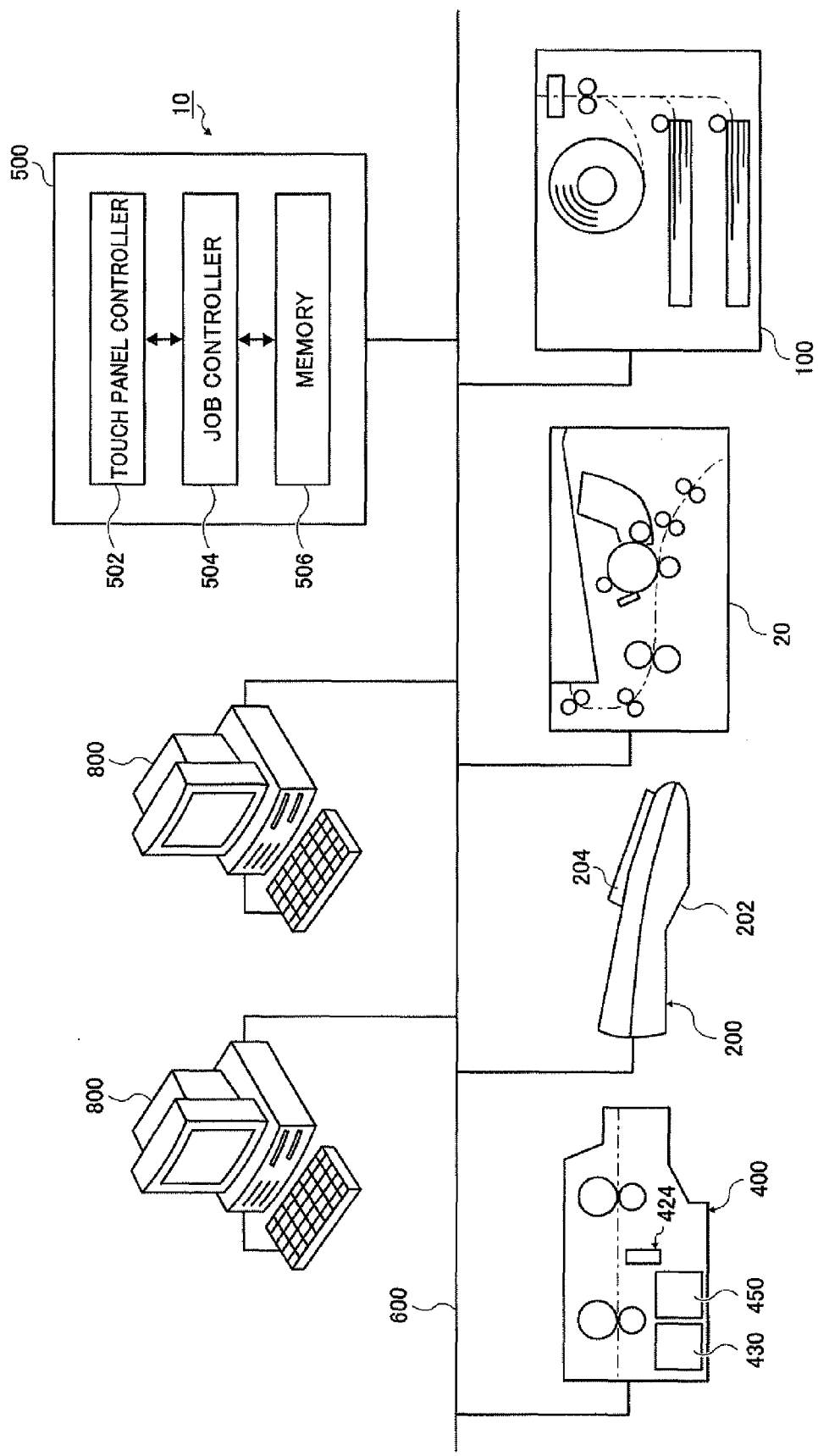
FIG. 1 is a block diagram showing a configuration of an image forming apparatus according to an exemplary embodiment of the present invention.

FIG. 1 shows an image forming apparatus 10 according to the exemplary embodiment of the present invention. As shown in FIG. 1, the image forming apparatus 10 has an image forming unit 20, a medium supply unit 100, a display operation unit 200, a document reading unit 400, and a control unit 500, communicably interconnected via a communication network 600 such as a LAN (Local Area Network). Further, the image forming apparatus 10 is connected to a single or plural external devices 800 such as a personal computer via the communication network 600.

The image forming unit 20, which is e.g. an electrophotographic type unit, forms an image based on an output from the document reading unit 400.

The medium supply unit 100 supplies a medium on which image formation is performed, such as normal paper, to the image forming unit 20.

The display operation unit 200, used as a user interface, has a display operation unit main body 202. A touch panel 204 used as a display and as an operation unit is attached to the display operation unit 200. Note that the touch panel means a device enabling an input operation by touching its screen with a finger or a specialized pen. The touch panel detects the position touched by the finger or the like and specifies a position on the screen, to provide an instruction to an operation object. Parameters for various settings such as selection of medium supplied to the image forming unit 20, the number of media for image formation, scaling and/or resolution upon document reading with the document reading unit 400, are inputted into the touch panel 204 by operating the touch panel 204 by an operator.

The document reading unit 400 has a document image acquisition part 424 used as a document image acquisition unit to read a document image and acquire the document image, a memory 430 used as a storage unit that stores the document image obtained by the document image acquisition part 424, and a document size detection circuit 450 used as a detection unit to detect the size or orientation of the document.

The document size detection circuit 450 which is e.g. a CPU (Central Processing Unit) detects the size or orientation of a document from the document image obtained by the document image acquisition part 424.

More particularly, first, a document image (read data) for a predetermined number of lines, in a direction orthogonal to a document conveyance direction, is inputted from the document image acquisition part 424 into the document size detection circuit 450. The document size detection circuit 450 detects two positions with considerable density change in the input document image, and calculates the width of the document with the two positions with considerable density change in the document image as ends of the document. Further, the document size detection circuit 450 compares the calculated width of the document with previously-stored various standardized paper widths such as A0 size and A3 size. When the calculated width of the document corresponds with or is close to the width of particular sized paper, the document size detection circuit 450 determines that the width of the document is the particular width.

The control unit 500 is used as a determination unit to determine whether or not the size or orientation of the document, the image data of which is obtained by the document image acquisition part 424, matches the set parameters. Further, the control unit 500 is used as a controller to output a document image stored in the memory 430 based on the parameters changed with a change part 246 (see FIG. 6) or a size setting part (see FIG. 8) to be described later.

Figure 2:
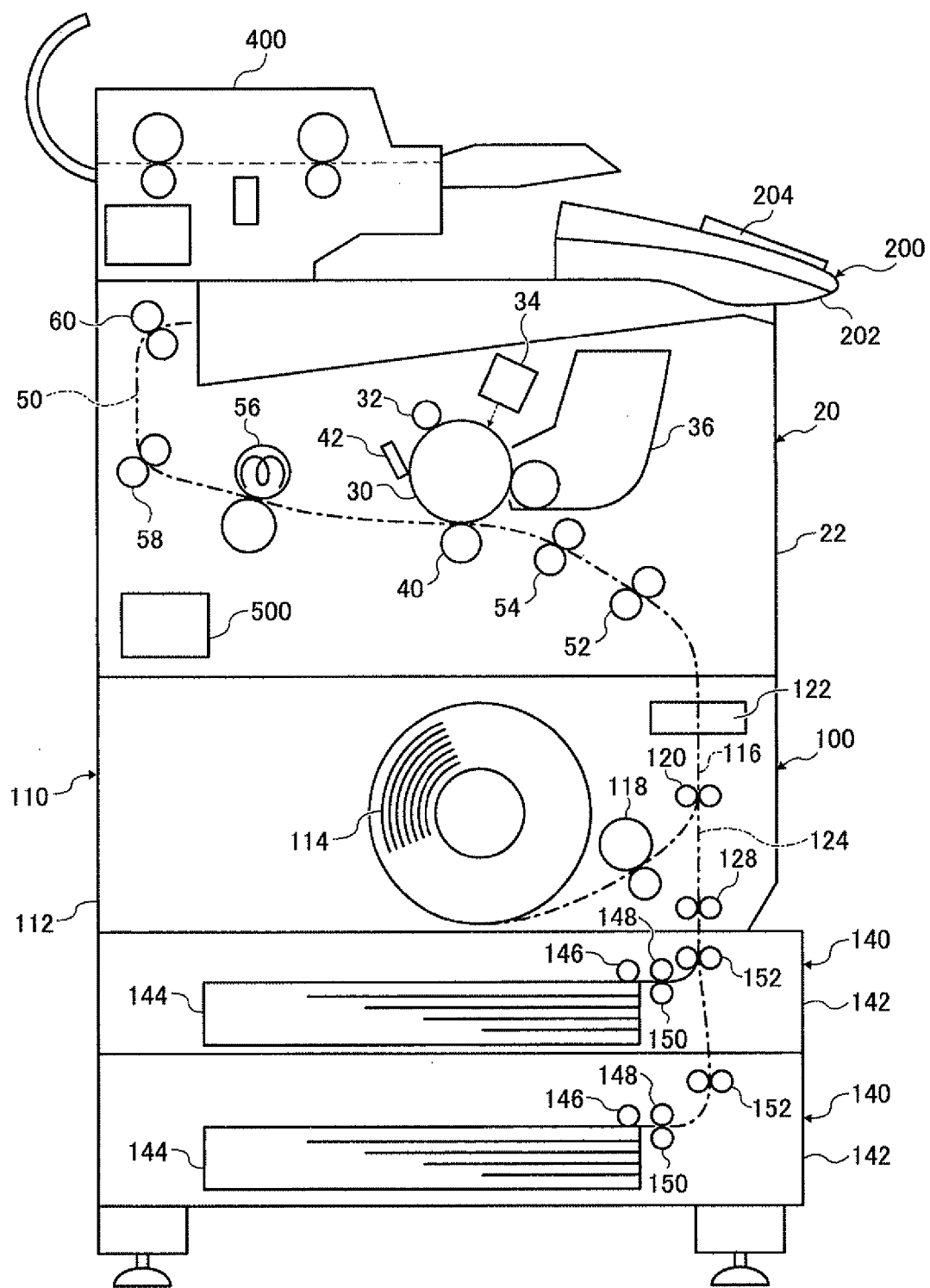
FIG. 2 is a cross-sectional view showing an image forming part and a medium supply part in the image forming apparatus according to the exemplary embodiment of the present invention.

Further, the control unit 500, having a processing circuit such as a CPU, is attached in e.g. the image forming unit 20 (see FIG. 2). The control unit 500 has a touch panel controller 502, a job controller 504, and a memory 506. The touch panel controller 502 controls inputs and displays at the touch panel 204, and transmits information on a parameter designated at the touch panel 204 to the job controller 504. The job controller 504 controls the image forming unit 20, the medium supply unit 100 and the document reading unit 400 to read a document and perform image formation based on the parameter information from the touch panel controller 502.

FIG. 2 shows the medium supply unit 100 and the image forming unit 20.

The medium supply unit 100 has e.g. one roll medium supply device 110 and e.g. two cut medium supply devices 140. The two cut medium supply devices 140 are arranged in layer under the roll medium supply device 110. Note that the roll medium means a rolled medium for image formation such as a roll sheet. Further, the cut medium means a medium cut in a predetermined size such as A4 size or B5 size, such as paper, for image formation.

The roll medium supply device 110 has a roll medium supply apparatus main body 112. A roll medium 114 is attached in the roll medium supply apparatus main body 112 such that the roll medium 114 can be rotated and the end of the roll medium 114 can be drawn out. Further, a roll medium conveyance passage 116 as a passage where the roll medium is conveyed is formed in the roll medium supply apparatus main body 112. A drawing roller 118, a conveyance roller 120 and a cutting device 122 are attached in the roll medium supply apparatus main body 112 along the roll medium conveyance passage 116, sequentially from the upstream side in the roll medium conveyance direction.

The drawing roller 118 is used for drawing out the end of the roll medium in a rolled state and drawing out the end toward the downstream side in the roll medium conveyance direction. The conveyance roller 120 is used for conveyance of the paper drawn out with the drawing roller 118 toward further downstream side, i.e., the image forming unit 20 side. The cutting device 122 is used for cutting a rear end side of the roll medium 114 supplied to the image forming unit 20 by a necessary length.

Further, a passing conveyance passage 124, through which the cut media respectively supplied from the two cut medium supply devices 140 are passed upon conveyance to the image forming unit 20 side, is formed in the roll medium supply apparatus main body 112. A conveyance roller 128 is attached along the passing conveyance passage 124. The conveyance roller 128 is used for conveyance of the cut media supplied from the two cut medium supply devices 140 to the image forming unit 20 side.

The cut medium supply devices 140 respectively have a cut medium supply device main body 142, and a cut medium container 144 containing cut media in a stacked state is attached in the cut medium supply device main body 142, attachably/removably to/from e.g. the cut medium supply device main body 142. Further, a delivery roller 146 to deliver a topmost cut medium in the cut medium container 144 to the downstream side in the cut medium conveyance direction, a conveyance roller 148 to convey the cut medium drawn with the delivery roller 146 toward further upstream side, and a retard roller 150 to retard the cut medium so as to prevent double feed of the cut media, are attached in the cut medium supply device main body 142. Further, a conveyance roller 152 is attached on the downstream side of the conveyance roller 148 and the retard roller 150.

The cut medium, supplied from one of the two cut medium supply devices 140 provided on the lower side, is conveyed through the cut medium supply device main body 142 positioned on the upper side and the roll medium supply apparatus main body 112 to the image forming unit 20. Further, the cut medium, supplied from the other of the two cut medium supply devices 140 provided on the upper side, is conveyed through the roll medium supply apparatus main body 112 to the image forming unit 20.

The image forming unit 20 can perform image formation based on e.g. a document image obtained with the document reading unit 400, and can form e.g. a monochrome image such as a black image. Further, the image forming unit 20 has an image forming unit main body 22, and a medium conveyance passage 50 through which a medium supplied from the medium supply unit 100 is passed is formed in the image forming unit main body 22.

Further, an image holder 30 such as a photoreceptor drum, a charging device 32 to uniformly charge the image holder 30, a latent image forming device 34 to form a latent image on the image holder 30 uniformly charged with the charging device 32, a developing device 36 to visualize the latent image on the image holder 30 formed with the latent image forming device 34 with toner, a transfer device 40 to transfer the toner image formed with the developing device 36 to a medium, and a cleaning device 42 to clean toner remaining on the image holder 30, are attached in the image forming unit main body 22.

Further, a conveyance roller 52, a registration roller 54, a fixing device 56, a conveyance roller 58, and a discharge roller 60 are attached in the image forming unit main body 22, along the medium conveyance passage 50, sequentially from the upstream side in the medium conveyance direction. The conveyance roller 52 conveys the medium toward the registration roller 54. The registration roller 54 starts rotation from a stopped state at predetermined timing, thereby sends the medium to a contact portion between the image holder 30 and the transfer device 40 at the timing of formation of a toner image on the image holder 30.

The fixing device 56 fixes the toner image transferred with the transfer device 40 onto the medium, to the medium with pressure and heat. The discharge roller 60 discharges the medium, to which the toner image is fixed, to the outside of the image forming unit main body 22.

Figure 3:
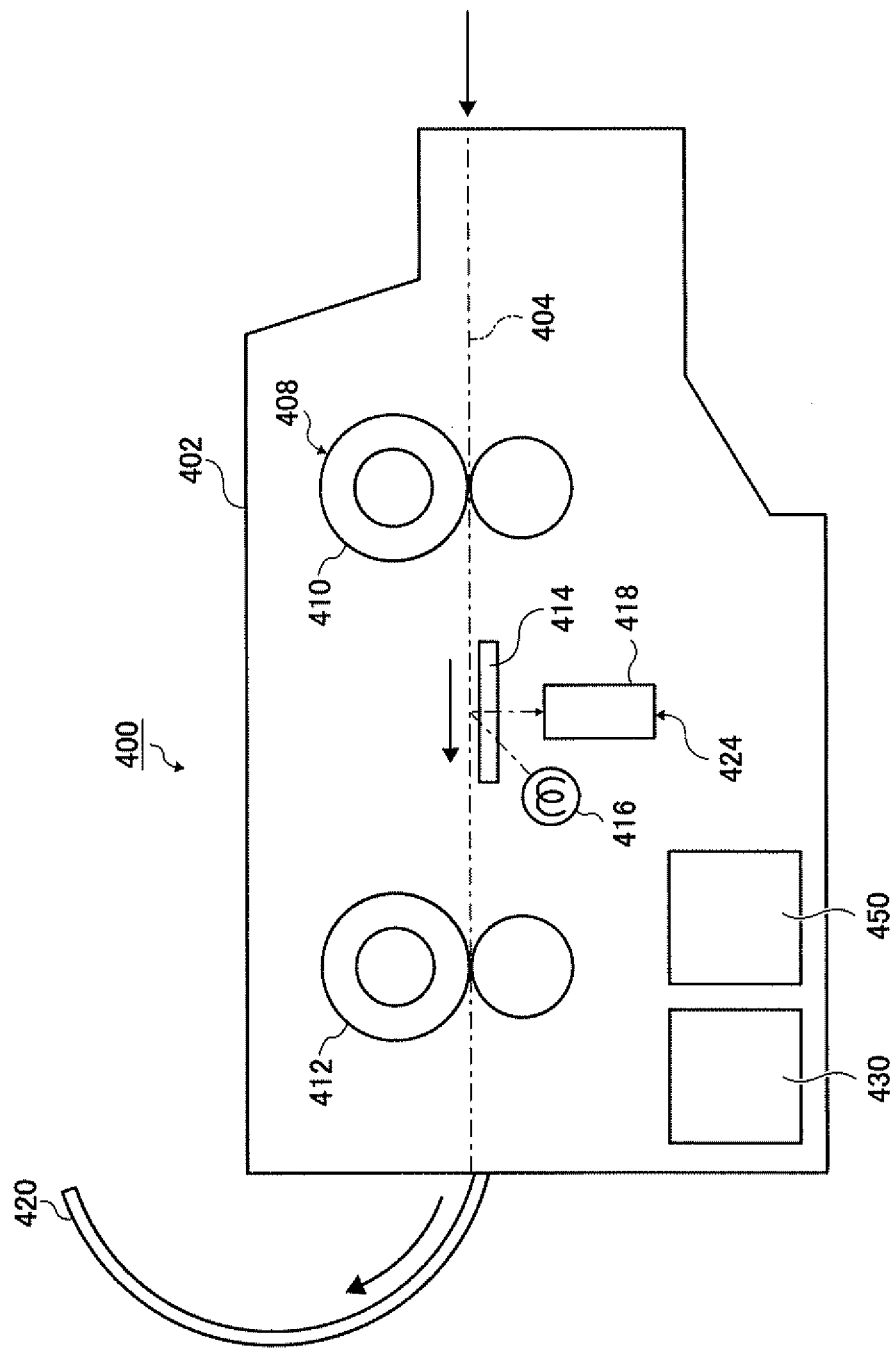
FIG. 3 is a cross-sectional view showing a document reader in image forming apparatus according to the exemplary embodiment of the present invention.

FIG. 3 shows the document reading unit 400.

The document reading unit 400 reads a monochrome or color image. The document reading unit 400 has a document reading unit main body 402, and a document conveyance passage 404 through which a document is passed is formed in the document reading unit main body 402. Further, a document conveyance part 408 used for conveyance of the document is attached in the document reading unit main body 402. The document conveyance part 408 has a conveyance roller 410 provided on the upstream side in a document conveyance direction and a conveyance roller 412 provided on the downstream side in the document conveyance direction.

Further, the above-described document image acquisition part 424 is attached in the document reading unit main body 402. The document image acquisition part 424 has a light transmitting member 414, a light emitting device 416 and a photoelectric converting member 418. As the light transmitting member 414, a light transmitting material such as glass is used, and is provided e.g. below the document conveyance passage 404. The light emitting device 416, which is e.g. a xenon lamp, emits light through the light transmitting member 414 on a document conveyed on the document conveyance passage 404.

The photoelectric converting member 418, provided in a position where light emitted from the light emitting device 416, reflected with a rear surface of the document, and collected with an optical system (not shown) enters, converts the incident light into an electric signal. As the photoelectric converting member 418, e.g., a CCD array is used. When a CCD array is used, the CCD array has a three-row photoreception sensor for three RGB colors. A guide member 420 to guide a part of the document discharged with the conveyance roller 412 to the outside the document reading unit main body 402, to the front side of the image forming apparatus 10 (right side in FIG. 2), is attached to the outside the document reading unit main body 402.

Figure 4:
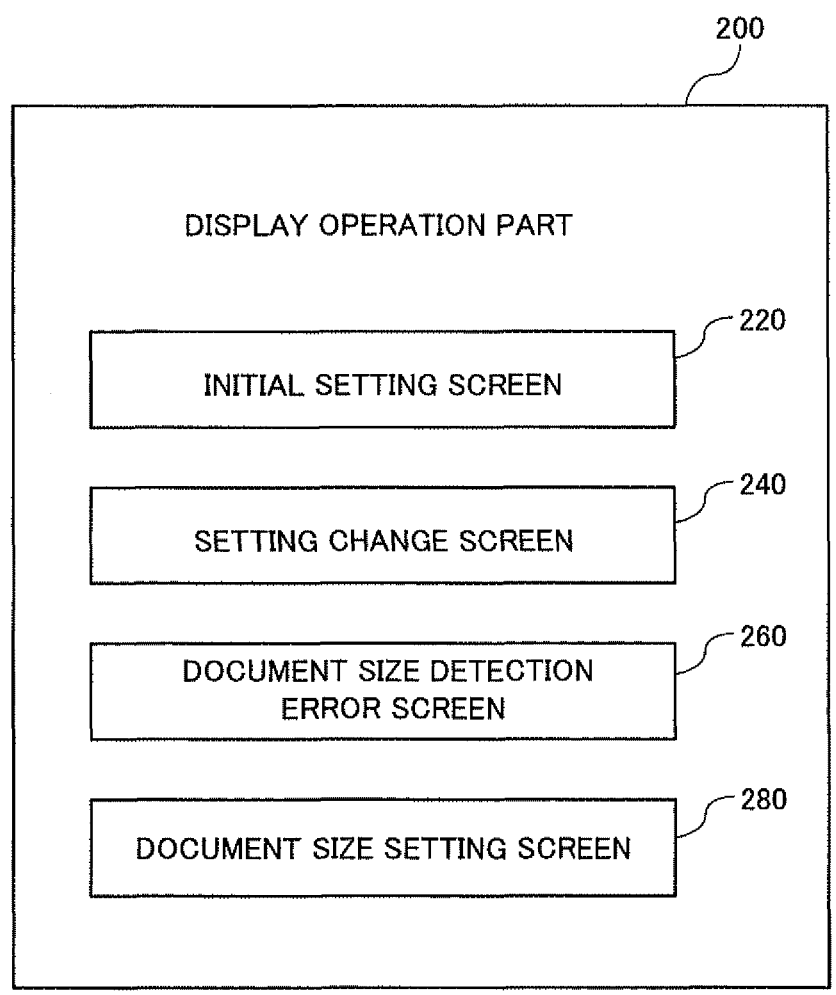
FIG. 4 is a block diagram showing a display operation part in the image forming apparatus according to the exemplary embodiment of the present invention.

FIG. 4 is a block diagram showing the display operation unit 200.

The display operation unit 200 has an initial setting screen 220, a setting change screen 240, a document size detection error screen 260 and a document size setting screen 280. The initial setting screen 220, the setting change screen 240, the document size detection error screen 260 and the document size setting screen 280 are selected and displayed on the touch panel 204.

The initial setting screen 220 is displayed on the touch panel 204 prior to document reading or image formation. For example, the initial setting screen 220 is used for setting parameters of the size of read document, the size and/or orientation of an output medium (paper), and the type of the output medium.

After the start of the operation of the image forming apparatus 10 for document reading or image formation, when the parameters and the like set by the initial setting screen 220 are to be changed at that time, the setting change screen 240 is displayed. On the setting change screen 240, for example, a parameter on the orientation of an output medium is changed.

When an error occurs in the document size detection by the document size detection circuit 450, the document size detection error screen 260 is displayed on the touch panel 204.

For example, when an error occurs in the document size detection by the document size detection circuit 450 and the document size detection circuit 450 cannot detect the document size, the document size setting screen 280 is used for the operator to input the parameter of the document size.

Figure 5:
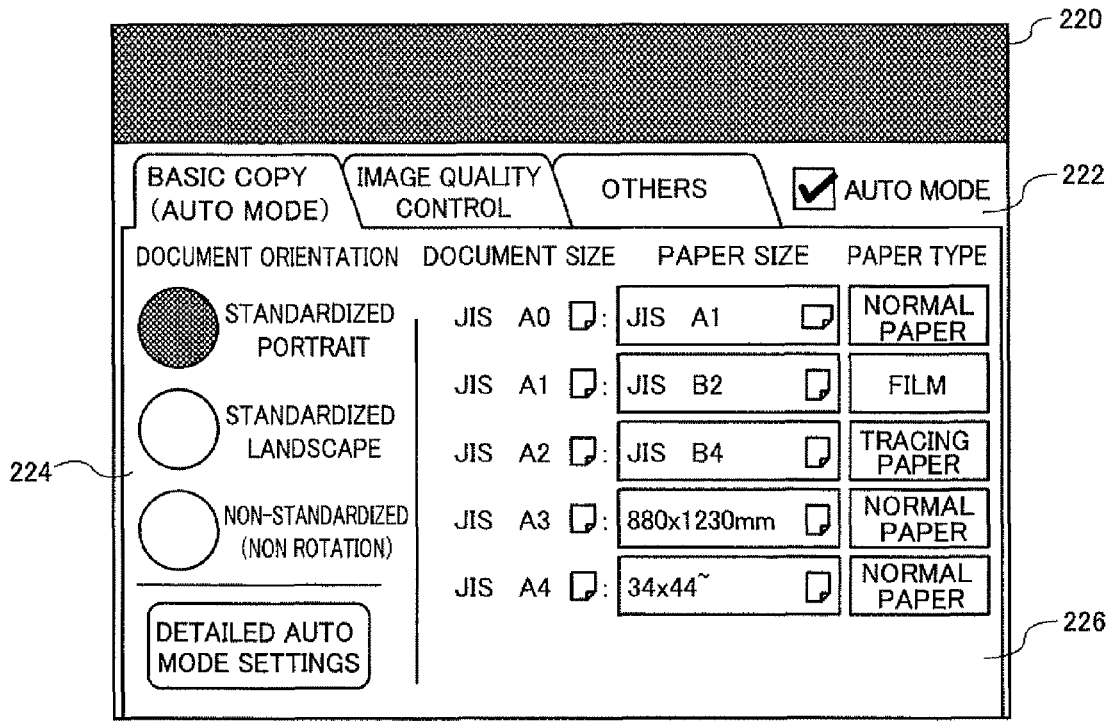
FIG. 5 is a sample of an initial setting screen displayed on the display operation part in the image forming apparatus according to the exemplary embodiment of the present invention.

FIG. 5 shows the initial setting screen 220.

The initial setting screen 220 has a mode selector 222 used for setting a parameter regarding mode selection, a document conveyance direction setting part 224 used for setting a parameter regarding the document conveyance direction, and a medium setting part 226 used for setting parameters to specify the size, the orientation and the type of an output medium by the size and orientation of each read document.

The mode selector 222 is used for selection of a mode to select a medium to be used, from auto mode and manual mode. The auto mode means a mode to select predetermined size, orientation and type of a medium in correspondence with the size and/or orientation of a read document. Further, the manual mode means a mode to arbitrarily select size, orientation and type of a medium by the operator upon each document reading or output to a medium. FIG. 5 shows a status where the auto mode is selected.

The document conveyance direction setting part 224 selects one of three parameters for a case where a document to be read is in a standardized size and the document is to be conveyed in a portrait direction, a case where the document to be read is in a standardized size and the document is to be conveyed in a landscape direction, and a case where the document to be read is not in a standardized size. Note that the conveyance of the document in the portrait direction means that the document conveyance direction corresponds with a long side direction of the document. On the other hand, the conveyance of the document in the landscape direction means that the document conveyance direction corresponds with a short side direction of the document.

The width of the document is detected by the document size detection circuit 450 (see FIG. 1). For example, when documents belonging to the same group in two types of sizes, such as an A0 sized document and an A1 sized document, are adjacent to each other, as the short side length of the larger document is equal to the long side length of the smaller document, these documents cannot be distinguished from each other only by detecting the document widths. Accordingly, in this exemplary embodiment, the document conveyance direction setting part 224 is used by the operator for setting a parameter for a case where the document is to be conveyed in the portrait direction or a parameter for a case where the document is to be conveyed in the landscape direction, thereby these documents are distinguished from each other.

As described above, the medium setting part 226 is used for setting parameters to specify the size, the orientation and the type of an output medium by size and orientation of each read document. For example, in the topmost row in the medium setting part 226 in FIG. 5, parameters for a case an A0 sized document is to be conveyed and read in the portrait direction and upon image formation on a medium, an A1 sized normal sheet to be conveyed in the landscape direction is used are set. In this case, an image of the read A0 sized document is reduced and outputted in A1 size.

Further, the second top row in FIG. 5, parameters for a case an A1 sized document is to be conveyed and read in the portrait direction and upon image formation on a medium, a B2 sized film to be conveyed in the landscape direction is used are set. In FIG. 5, "tracing paper" means that a parameter to use tracing paper as a type of medium is set.

FIG. 5 shows combinations of parameters for five sizes, five orientations and five types of media respectively set for five types of documents. Regarding other document sizes, although parameters are similarly set, the display is produced regarding five types of documents with high frequency of use. On the other hand, the medium supply unit 100 supplies three types of media with the roll medium supply device 110 and the cut medium supply devices 140 (see FIG. 2). In this exemplary embodiment, for example, by changing the cut medium container 144 attached to the cut medium supply device 140 in correspondence with the type of a medium to be used, five types of media can be supplied. It may be arranged such that in place of changing the cut medium container 144, two other supply devices are used in addition to the three supply devices, i.e. the roll medium supply device 110 and the cut medium supply devices 140 to supply five types of paper sheets different in size, orientation and/or type.

Figure 6:
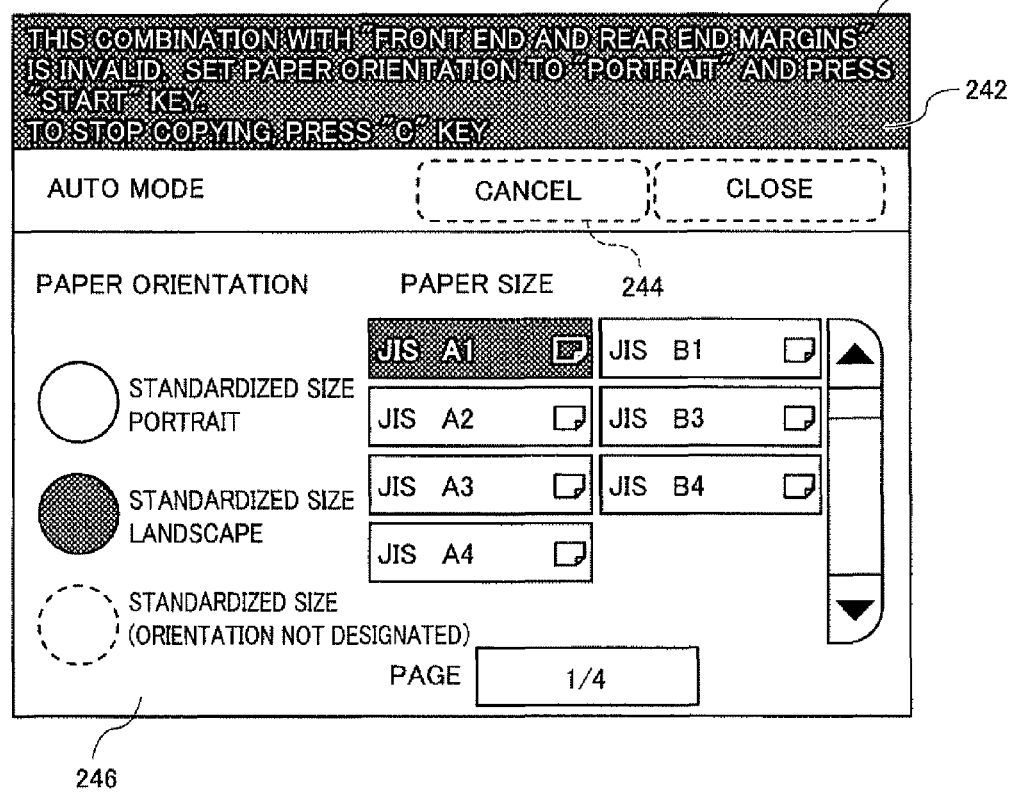
FIG. 6 is a sample of a setting change screen displayed on the display operation part in the image forming apparatus according to the exemplary embodiment of the present invention.

FIG. 6 shows the setting change screen 240.

As described above, after the start of operation of the image forming apparatus 10, when parameters set at that time such as the parameters set on the initial setting screen 220 are to be changed, the setting change screen 240 is displayed. The setting change screen 240 has a notification part 242 to notify that the size or orientation of a document and the other parameters do not match each other, a cancel part 244, and a change part 246 used for an operation to change the parameters at that time.

The notification part 242 indicates that the size or the like of the document does not match the other parameters, and displays a prompt for the operator to perform an operation to manipulate the change part 246 to change the parameters and press a start key for restart, or an operation to stop the output (copy) by depression of a C key (clear key). In the example shown in FIG. 6, a prompt to set the orientation of the paper (medium) to be used, "first set paper orientation to portrait direction" is displayed.

On the change part 246, a display to change the parameters to remove the mismatch between the document size or the like and the other parameters, i.e., the mismatch shown on the notification part 242, is produced. In the example of FIG. 6, the set paper direction and paper size are displayed on the change part 246, and a display to prompt change of the medium direction to the portrait direction is produced on the notification part 242.

Note that in FIG. 6, "front end and rear end margins" means blank space where image formation is not performed, provided at least one of the front end side and the rear end side of an output medium in the conveyance direction. For example, in a case where a document reading orientation and the orientation of a medium used upon output are different from each other, more particularly, in a case where the document reading orientation is the portrait direction but the orientation of the medium is the landscape direction, when the front end and rear end margins are set, it is unclear whether the operator intends to provide a margin on the medium in a position corresponding to the front end side or rear end side of the document, or intends to provide a margin on the front end side or rear end side in the medium conveyance direction. In such case, the margin might be provided in a position different from the operator's intended position. Accordingly, in the image forming apparatus 10, when the document reading orientation and the orientation of a medium used in output are different from each other, the front end and rear end margins cannot be set.

When the document reading orientation and the orientation of a medium used in output are different from each other and the front end and rear end margins are to be set, a display for selection of a medium in the same orientation as the document conveyance direction is produced on the change part 246 as described above.

Figure 7:
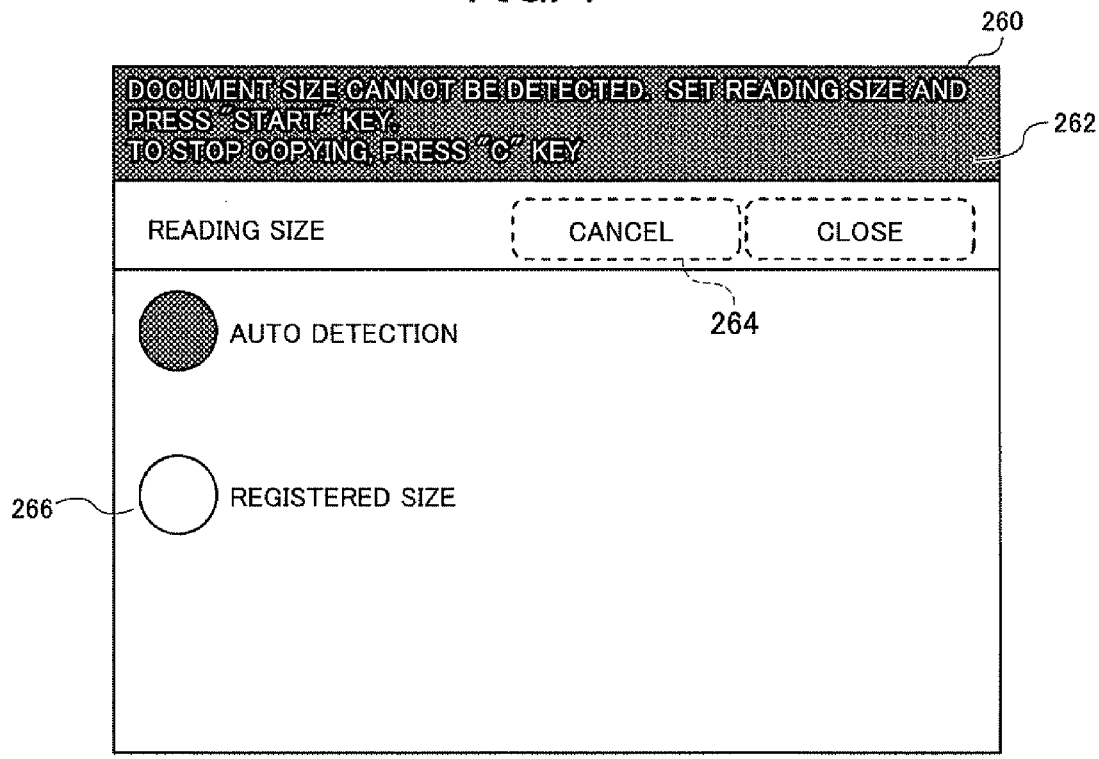
FIG. 7 is a sample of a document size detection error screen displayed on the display operation part in the image forming apparatus according to the exemplary embodiment of the present invention.

FIG. 7 shows the document size detection error screen 260.

As described above, the document size detection error screen 260 is displayed upon occurrence of an error in document size detection by the document size detection circuit 450. Note that the document size detection error means that, e.g., the document size (document width) cannot be detected by the document size detection circuit 450 even though parameters for reading of a standardized document by e.g. selection of the auto mode with the mode selector 222 (see FIG. 5). The document size detection error may be caused when, e.g., a document is conveyed in a slanting position and the detected width of the document is longer than the original document width.

The document size detection error screen 260 has a notification part 262 to notify occurrence of an error in document detection, a cancel part 264, and a change part 266 used for an operation to change the parameters at that time.

The notification part 262 indicates that an error has occurred in the document size detection, and displays a prompt to input a parameter to specify a document size such as "set reading size". Note that when output onto a medium such as paper is stopped in place of changing the parameter, a C key (clear key) (not shown) is operated.

The change part 266 is operated when a parameter is changed so as to change a mode for automatic document width detection to a mode for selection of document size from plural previously registered document sizes.

Figure 8:
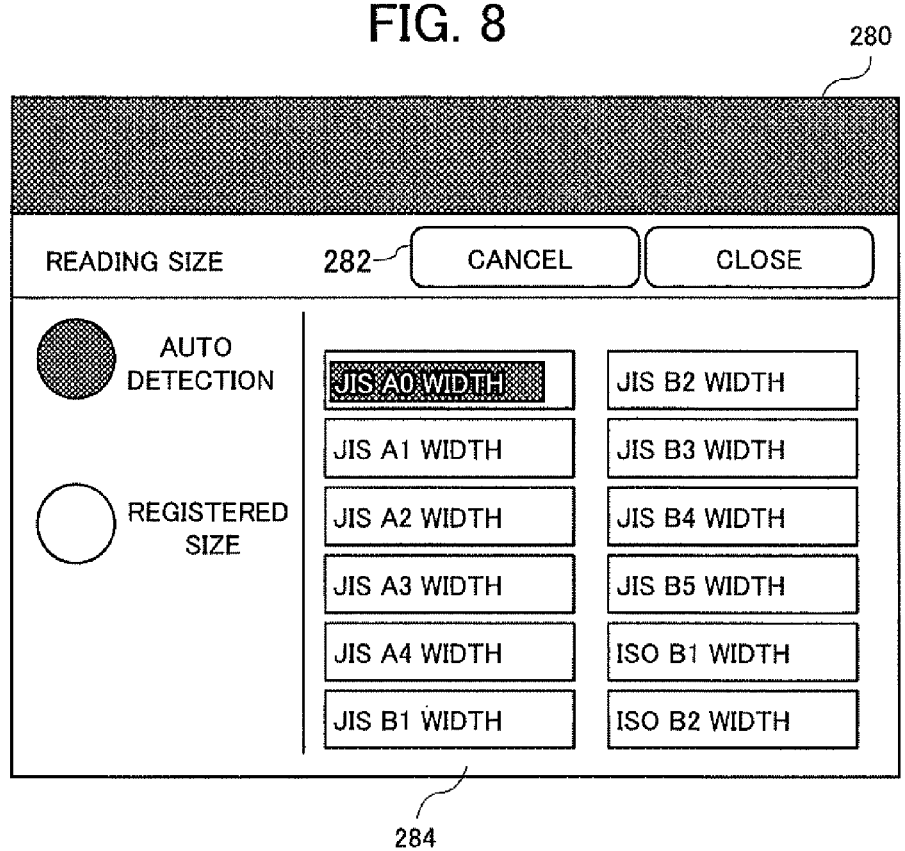
FIG. 8 is a sample of a document size setting screen displayed on the display operation part in the image forming apparatus according to the exemplary embodiment of the present invention.

FIG. 8 shows the document size setting screen 280.

As described above, when an error occurs in the document size detection by the document size detection circuit 450 and the document size detection circuit 450 cannot detect a document size, the document size setting screen 280 is used for the operator to input a parameter of a document size. The document size setting screen 280 is displayed when the change part 266 in the document size detection error screen 260 is operated. The document size setting screen 280 has a cancel part 282 to cancel an operation to set a document size and a size setting part 284 to input a parameter to specify a document size.

Plural previously stored document types are displayed on the size setting part 284, and one of the displayed sizes is selected, thereby the width of the document can be set. In FIG. 8, the width of the document is set to A0 width.

Figure 9:
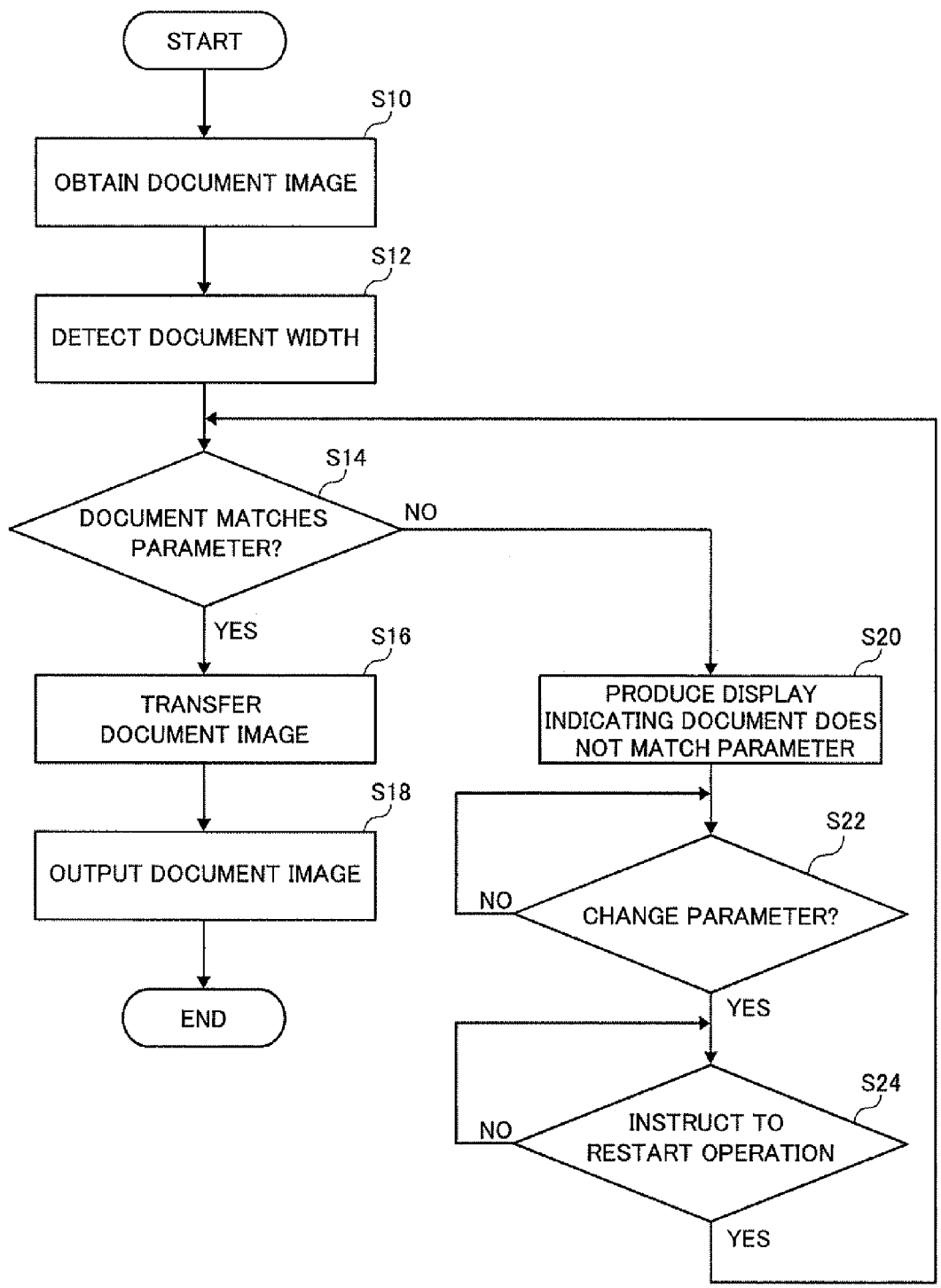
FIG. 9 is a flowchart showing the operation of the image forming apparatus according to the exemplary embodiment of the present invention.

FIG. 9 is a flowchart showing the operation of the image forming apparatus 10.

As shown in FIG. 9, when the series of operation is started by operation of e.g. a start part (not shown) of the touch panel, at step S10, the job controller 504 in the control unit 500 controls the document conveyance part 408 to start document conveyance, controls the document image acquisition part 424 to obtain a document image, and store the obtained image in the memory 430.

At this step S10, regardless of document width, a maximum width document image obtainable by the document image acquisition part 424 is obtained, and the obtained maximum width document image is stored in the memory 430. For example, when the maximum width of document image obtainable by the document image acquisition part 424 is the width of A0 size document in the landscape direction, even though an A3 sized document image is obtained in the landscape direction, a document image with the A0 sized document width in the landscape direction is obtained, and the obtained document image is stored in the memory 430.

At next step S12, the job controller 504 controls the document size detection circuit 450 to detect the size (width) and orientation of the document based on the document information obtained by the document image acquisition part 424, and transmit the detected size and orientation of the document to the control unit 500.

At next step S14, the control unit 500 determines whether or not the size or orientation of the document transmitted from the document size detection circuit 450 matches the parameters at that time, e.g., parameters inputted on the initial setting screen 220. Note that as an example where the the size or orientation of the document does not match the parameters, a case can be given where the orientation of a document and that of a medium used in output are different from each other and a parameter for formation of a margin at the front end or rear end of the medium is set as described above. Further, as another example where the size or orientation of the document does not match the parameters, a case can be given where the document size detection circuit 450 cannot detect the document size even though a parameter for reading a standardized size document is set, as described above.

When it is determined at step S14 that the size or orientation of the document matches the set parameters, the process proceeds to step S16, while it is determined that the size or orientation of the document does not match the set parameters, the process proceeds to step S20.

At step S16, the job controller 504 of the control unit 500 transfers the document image stored in the memory 430 to the memory 506 on the control unit 500 side.

At step S18 following step S16, the job controller 504 outputs the document image stored in the memory 430 to the image forming unit 20, and controls the image forming unit 20 to perform image formation based on the document information outputted to the image forming unit 20, and terminates the series of processing. At step S16, not the maximum width document image obtainable by document image acquisition part 424 but the document image having a width corresponding to the document width is outputted to the image forming unit 20. Further, prior to the output to the image forming unit 20, necessary processing such as image processing is performed on the document image.

It may be arranged such that at step S18, in place of the output of the document image to the image forming unit 20, or with the output of the document image to the image forming unit 20, the document image is outputted to single or plural external devices 800.

On the other hand, at step S20, the touch panel controller 502 controls the touch panel 204 to produce a display indicating that the size or orientation of the document does not match the parameters. That is, the touch panel controller 502 controls the touch panel 204 to display the setting change screen 240 (see FIG. 6) having the notification part 242 or the document size detection error screen 260 (see FIG. 7) having the notification part 262 in correspondence with occurred mismatch.

At step S22 following step S20, it is checked that the operator has changed the parameters, then the processing proceeds to the next step S24. More particularly, it is checked that the parameter is changed so as to change the orientation of the medium (paper) to be used with the change part 246 in the setting change screen 240, or that parameters to specify the document are set with the size setting part 284 in the document size setting screen 280, then the process proceeds to the next step S24.

At the next step S24, restart of the operation by e.g. operation of an operation restart part (not shown) such as a start key is waited, and the process returns to step S14.

At step S14 returned from step S24, the control unit 500 determines whether the size or orientation of the document matches the parameters changed at step S22. When it is determined at step S24 that the size or orientation of the document does not match the parameters, the process proceeds to step S20 again.

On the other hand, when it is determined at step S14 returned from step S24 that the size or orientation of the document matches the set parameters, at the next step S16, the document image previously stored in the memory 430 is transferred to the memory 506 on the control unit 500 side. Then at step S18, the image forming unit 20 performs image formation or the like.

As described above, at steps S16 and S18, when the size or orientation of the document does not match the parameters and the parameters are changed so as to remove the mismatch, the document image stored in the memory 430 is used in e.g. output to the image forming unit 20. Accordingly, when the size or orientation of the document does not match the parameters, the operation and manipulation to convey the document with the document conveyance part 408 and obtain the image of the document conveyed with the document conveyance part 408 with the document image acquisition part 424 are unnecessary.

As described above, the present invention is applicable to a document reading device and an image forming apparatus such as a copier having the document reading device.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document reading device comprising:
a document image acquisition unit that reads a document and obtains a document image;
a memory that holds the document image obtained by the document image acquisition unit;
a determination unit that determines whether or not a size or an orientation of the document, the image of which is obtained by the document image acquisition unit, matches a set first parameter that is related to the size of the document and a set second parameter that is related to the orientation of the document, respectively, and when the orientation of the document does not match an orientation of a medium used to output the image, front and rear end margins on the medium cannot be set;
a display unit that, when it is determined that the size and orientation of the document does not match the set parameter, displays a screen to change a setting of the parameter so as to change at least one of the first parameter and the second parameter; and
a change instruction unit that instructs to change at least one of the first parameter and the second parameter displayed by the display unit.

2. The document reading device according to claim 1, further comprising a display that displays a result of the determination by the determination unit.

3. The document reading device according to claim 2, wherein, when it is determined by the determination unit that the size or orientation of the document does not match the set parameter, the display produces a display for an operator to change the parameter.

4. The document reading device according to claim 1, further comprising a detection unit that detects the size or orientation of the document,
wherein the determination unit determines whether or not the size or orientation of the document detected by the detection unit matches the set parameter.

5. An image forming apparatus comprising:
a document reading device that reads a document; and
an image forming part that forms an image based on an output from the document reading device,
the document reading device having:
a document image acquisition unit that reads the document and obtains a document image;
a memory that holds the document image obtained by the document image acquisition unit;
a determination unit that determines whether or not a size and an orientation of the document, the image of which is obtained by the document image acquisition unit, matches a set first parameter that is related to the size of the document and a set second parameter that is related to the orientation of the document, respectively, and when the orientation of the document does not match an orientation of a medium used to output the image, front and rear end margins on the medium cannot be set;

a display unit that, when it is determined that the size or orientation of the document does not match the set parameter, displays a screen to change a setting of the parameter so as to change at least one of the first parameter and the second parameter; and a change instruction unit that instructs to change at least one of the first parameter and the second parameter displayed by the display unit.

* * * * *